United States Patent [19]
Riedel

[11] 3,811,758
[45] May 21, 1974

[54] CARTRIDGE-LOADED MOTION PICTURE PROJECTOR

[75] Inventor: Wolfgang Riedel, Winnenden, Germany

[73] Assignee: Robert Bosch Photokino GmbH, Stuttgart, Germany

[22] Filed: Aug. 4, 1972

[21] Appl. No.: 277,930

[30] Foreign Application Priority Data
Aug. 6, 1971 Germany.......................... 2139416
May 23, 1972 Germany.......................... 2224968

[52] U.S. Cl. .................................. 352/72, 352/74
[51] Int. Cl. .................................. G03b 23/02
[58] Field of Search ............ 352/72, 73, 74, 75, 76, 352/77

[56] References Cited
UNITED STATES PATENTS
3,675,992  7/1972  Winkler............................... 352/72
3,574,453  4/1971  Hara................................... 352/72
2,912,899  11/1959  Wangerin............................ 352/72

*Primary Examiner*—Monroe H. Hayes
*Attorney, Agent, or Firm*—Michael S. Striker

[57] ABSTRACT

The housing of a motion picture projector has a chamber for a portion of a film-containing cartridge. The inlet of the chamber is surrounded by walls at least one of which extends into the path of movement of a cartridge into the chamber to be displaced by and to thereupon bear against the inserted cartridge, either owing to its resiliency or under the action of a spring. The movable wall can be moved to a closing position in which it closes the inlet and it can be held in the closing position by a cover for the housing or by a locking bolt. The movable wall can constitute a centering plate for the inserted cartridge and can be mounted for movement in and counter to the direction of insertion of cartridges into the chamber.

14 Claims, 8 Drawing Figures

3,811,758

CARTRIDGE-LOADED MOTION PICTURE PROJECTOR

BACKGROUND OF THE INVENTION

The present invention relates to cinematographic apparatus in general, especially to cartridge-loaded motion picture projectors. More particularly, the invention relates to improvements in motion picture projectors of the type wherein a film-containing cartridge or cassette can be received in a chamber which is defined by the housing of the apparatus. Still more particularly, the invention relates to improvements in motion picture projectors wherein the housing of the projector supports latching means capable of engaging complementary latching means on a properly inserted cartridge.

It is already known to provide a motion picture projector with a rotary drive member or spindle which extends into the central opening of the reel in a properly mounted cartridge. Reference may be had to U.S. Pat. No. 3,275,253 granted Sept. 27, 1966 to J. Cherniavskyj.

The cartridge is provided with ribs which must be received in complementary recesses of the projector housing. Furthermore, the housing is provided with movable claws which enter recesses in the adjacent panel of a properly mounted cartridge to hold the latter against uncontrolled movement from an optimum position. A drawback of such projectors and cartridges is that the construction of latching means is rather complex, that the cartridges must be produced with a relatively high degree of precision, and also that the insertion and/or removal of cartridges is a time-consuming operation which requires a substantial amount of skill on the part of the operator. Moreover, the spindle is a part which is not absolutely necessary for proper transport of film during the projection of images and/or during rewinding.

It was further proposed to provide the housing of a motion picture projector with a chamber which is dimensioned to snugly receive at least a portion of a film-containing cartridge. The housing of the projector is provided with latching means which engages complementary latching means. Such cinematographic apparatus also exhibit a number of serious drawbacks. Thus, the latching means of the cartridge must be accurately aligned with latching means on the housing prior to insertion of a cartridge into its chamber. Also, an improperly aligned cartridge is likely to jam during insertion into the housing so that its complete insertion and/or removal might result in damage to the cartridge and/or to the apparatus.

SUMMARY OF THE INVENTION

An object of the invention is to provide a novel and improved cartridge-loaded cinematographic apparatus, particularly an improved motion picture projector which is constructed and assembled with a view to reduce or completely eliminate the likelihood of jamming of cartridges during insertion or withdrawal from a chamber in the housing of the motion picture projector.

Another object of the invention is to provide the motion picture projector with novel and improved means for holding a properly inserted cartridge against undesirable movements during the projection of images as well as during rewinding of film onto the reel or spool in the interior of the cartridge.

A further object of the invention is to provide a novel and improved motion picture projector which is constructed and assembled in such a way that the insertion and/or removal of cartridges from the chamber of its housing can be carried out by unskilled persons without any danger of damaging the sensitive parts of the projector or the cartridge.

An additional object of the invention is to provide a motion picture projector with novel and improved means for normally closing the chamber which is defined by its housing for reception of film-containing cartridges.

Still another object of the invention is to provide the motion picture projector with novel and improved means for centering the inserted cartridge in its chamber.

A feature of the invention resides in the provision of a cinematographic apparatus, particularly a cartridge-loaded motion picture projector, which comprises a housing defining a cartridge-receiving chamber having an inlet, preferably at its upper end. The housing includes a plurality of walls which surround the inlet of the chamber, and at least one of the walls is movable and tends to assume a predetermined position in which the movable wall reduces the area of the inlet to less than that necessary for insertion of a cartridge into the chamber so that the insertion of a cartridge into the chamber necessitates a displacement of the movable wall from its predetermined position (preferably by a cartridge which is in the process of being inserted into the chamber) and the thus displaced movable wall thereupon bears against the inserted cartridge due to its tendency to reassume the predetermined position.

The cartridges which are to be used with the improved projector are preferably of the type having latching means adjacent to at least one wall of the housing in the inserted position of a cartridge. The last mentioned wall of the housing is provided with or carries complementary latching means which engages the latching means of the inserted cartridge to thereby hold the cartridge against movement in at least one direction relative to the housing, for example, against movement in a direction to withdraw the cartridge from the chamber.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
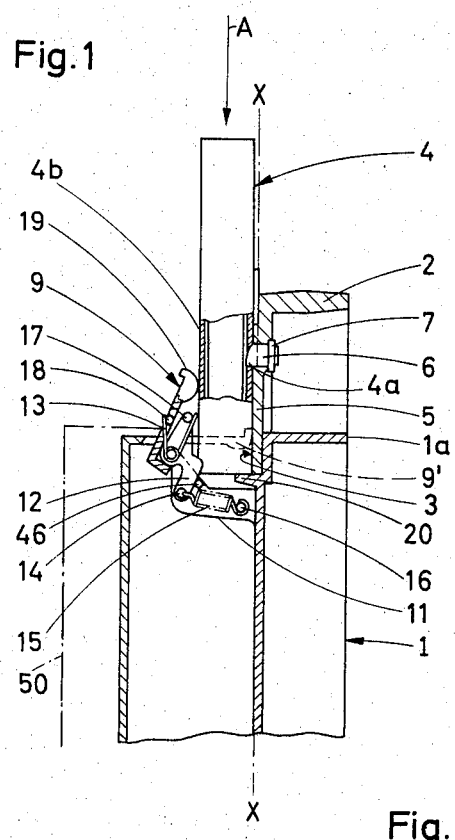
FIG. 1 is a fragmentary transverse vertical sectional view of a motion picture projector which embodies one form of the invention and wherein the walls surrounding the inlet of the chamber for film-containing cartridges include a single movable wall which is shown in its operative position.
Figure 2:
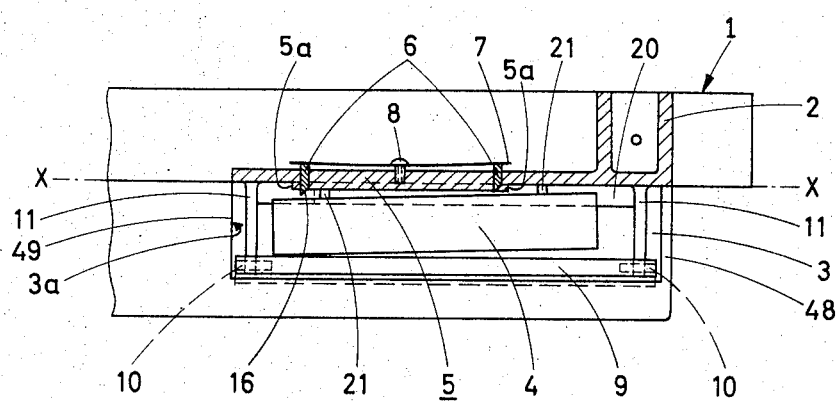
FIG. 2 is a fragmentary plan view of the motion picture projector, with the cartridge shown in a fully inserted but uncentered position.

FIGS. 1 and 2 illustrate a portion of a motion picture projector having a housing 1 including a top wall 1a which is provided with an upwardly extending integral handle 2. The handle 2 is located at a level above and immediately behind a relatively shallow chamber or recess 3 which can receive the lower portion of a film-containing cartridge or cassette 4. The lower or inner end of the chamber is located at the level of the top surface of a platform or rib 20 which can be integral with the housing 1 and is located at the lower end of a centering plate 5 here shown as being integral with the housing 1 and constituting one of four walls which surround an inlet 3a of the chamber 3. The inlet 3a is of rectangular outline and, in addition to the plate 5, is surrounded by two relatively short parallel walls 48, 49 shown in FIG. 2 as well as by a movable wall or flap 9 which is located opposite the plate 5. The length of the flap 9 exceeds the length of the wall 48 or 49 and at least equals the length of the plate 5, as considered in the circumferential direction of the inlet 3a.

The plate 5 is formed with two openings for reciprocable latching elements 6 which are movable to and from the extended positions shown in FIG. 1 in which they extend into complementary apertured latching elements 4a (one shown in FIG. 1) forming part of the rear panel of the cartridge 4. The latching elements 6 extend rearwardly through the respective openings of the plate 5 and are attached to the respective ends of an elongated leaf spring 7 at the rear side of the plate 5. The central portion of the leaf spring 7 is attached to the plate 5 by one or more rivets 8 or analogous fasteners. The spring 7 tends to maintain the latching elements 6 in their extended positions.

The ends of the movable wall or flap 9 are turnable about a horizontal axis defined by two coaxial pivot pins 10 mounted in forwardly extending supporting brackets 11 of the housing 1. The pivot axis for the flap 9 is parallel to the plane of the centering plate 5. One of the pivot pins 10 further supports a pivotable two-armed lever 12 which forms part of a first biasing device and serves to urge the flap 9 from a closing position 9' indicated in FIG. 1 by broken lines. In such closing position, the flap 9 extends across the top of the chamber 3 and at least substantially closes the inlet 3a. The first biasing device further includes a helical spring 15 one end of which is attached to a post 16 in the housing 1 and the other end of which extends into a hole 14 provided in the lower arm of the lever 12. The spring 15 tends to pivot the lever 12 in a counterclockwise direction, as viewed in FIG. 1 so that the lower arm of the lever normally bears against a stop pin 46 on the adjacent supporting bracket 11. A second biasing device includes a torsion spring 13 which is closely adjacent to the lever 12 and is convoluted around the respective pivot pin 10. One leg of the spring 13 bears against a post 17 on the upper arm of the lever 12 and the other leg of this spring bears against a post 18 on the flap 9. The purpose of the spring 13 is to urge the flap 9 to a predetermined intermediate position located between a cartridge-engaging position (shown in FIG. 1 by solid lines) and the closing position 9'. Thus, the first biasing device including the lever 12 and helical spring 15 urges the flap 9 from the position 9' and the second biasing device including the torsion spring 13 urges the flap 9 from the illustrated position toward the aforementioned predetermined intermediate position. In such intermediate position, the flap 9 extends into the path of movement (arrow A) of a cartridge 4 on its way into the chamber 3 so that the front panel 4b of the cartridge must pivot the flap 9 counterclockwise about the pins 10 whereby the leaf spring 13 stores energy and urges the flap 9 toward its intermediate position. Thus, when the lever 12 is allowed to assume the position shown in FIG. 1, the leaf spring 13 urges the flap 9 toward the intermediate position in which the size or area of the inlet 3a is less than that necessary to allow for insertion of a cartridge 4 into the chamber 3. That edge portion of the flap 9 which engages or is immediately adjacent to the plate 5 in the position 9' of the flap is rounded, as at 19, to insure that the flap can be pivoted by the panel 4b against the opposition of the torsion spring 13 when the cartridge 4 is caused to move downwardly in the direction indicated by arrow A.

The flap 9 is automatically moved to the closing position 9' in response to placing of a suitably configurated at least partially rigid cover member or cap 50 (indicated in part by phantom lines) over the housing 1. The cover member 50 then stresses the spring 15. The latter is free to contract and to return the lever 12 to the position shown in FIG. 1 as soon as the cover member 50 is lifted off or otherwise detached from the housing 1.

FIG. 1 shows the cartridge 4 in its fully inserted position. The cartridge 4 is centered by the plate 5 so that the apertures of its female latching elements 4a receive the extended latching elements 6 of the plate 5. At the same time, the rounded edge portion 19 of the flap 9 bears against the panel 4b under the bias of the torsion spring 13 so that the cartridge 4 is properly held against accidental movement relative to the housing 1. In such position, the leader of convoluted motion picture film in the cartridge 4 can be automatically withdrawn through an opening in a side panel or in the bottom panel of the cartridge to be threaded through the projector behind the film gate and to be attached to a takeup reel, not shown. The bottom panel of the cartridge 4 rests on the platform or rib 20 of the housing 1. If the cartridge 4 is thereupon removed from the chamber 3 (by moving it first in a direction to the left, as viewed in FIG. 1, so that the latching elements 6 are disengaged from the complementary latching elements 4a and thereupon upwardly counter to the direction indicated by arrow A), the torsion spring 13 pivots the flap 9 in a clockwise direction and slightly beyond the solid-line position of FIG. 1 so that the flap 9 reassumes the aforementioned predetermined intermediate position in which it reduces the area of the inlet 3a below that which is necessary for insertion of a cartridge. The flap 9 is returned to the closing position 9' in response to renewed placing of the cover member 50 onto the housing 1.

FIG. 2 shows the cartridge 4 in an inserted but uncentered position. The centering means of the plate 5 are its two vertical edge faces 5a which are spaced apart by a distance equal to or is slightly less than that between two projections 21 extending rearwardly from the rear panel of the cartridge 4. The length of the inlet 3a exceeds the width of the cartridge 4 and the latter is shown in FIG. 2 to the right of its centered position. In order to center the cartridge 4 subsequent to insertion into the chamber 3, the user must push the cartridge in a direction to the left, as viewed in FIG. 2, until the left-hand projection 21 moves beyond the left-hand edge face 5a. The spring 13 thereupon causes the flap 9 to pivot slightly beyond the position shown in FIG. 2 (to the position shown in FIG. 1 by solid lines) and the latching elements 6 enter the apertured latching elements 4a. The right-hand projection 21 of the cartridge 4 is then closely adjacent to or abuts against the right-hand edge face 5a of the plate 5. As shown in FIG. 2, the front end portions of the latching elements 6 are provided with suitably inclined front end faces 16 which enable the rear panel of the inserted cartridge 4 to slide thereover on its way toward the fully centered position. The right-hand projection 21 of FIG. 2 abuts against the front side of the adjacent portion of the housing 1 and is guided thereby while the left-hand projection 21 slides along the front side of the centering plate 5 toward and beyond the left-hand edge face 5a. The cartridge 4 is slightly tilted on insertion into the chamber 3 (in the uncentered position of FIG. 2) but is free to pivot clockwise under the bias of the torsion spring 13 as soon as the left-hand latching element 6 registers with the corrresponding latching element 4a in the rear panel of the cartridge. In its fully inserted and centered position, the cartridge 4 is held against movement in the direction indicated by arrow A by the platform 20 of the housing 1. The latching elements 6 hold the cartridge 4 against movement counter to the direction indicated by arrow A, and the torsion spring 13 causes the edge portion 19 of the flap 9 to hold the cartridge against movement away from the centering plate 5. Thus, the cartridge 4 is held with a high degree of accuracy and with a sufficient force to remain in requisite position during withdrawal of film from and during rewinding of film onto the customary reel therein. The centering of cartridge 4 in the position shown in FIG. 2 presents no problems because the cartridge can readily slide along the edge portion 19 and is automatically arrested when the right-hand projection 21 engages the right-hand edge face 5a.

As mentioned before, the cartridge 4 can be removed from the chamber 3 by moving it forwardly (away from the centering plate 5) so as to withdraw the latching elements 6 from the complementary latching elements 4a. In the next step, the cartridge 4 is moved upwardly counter to the direction indicated by arrow A and away from the platform 20. The spring 13 thereupon returns the flap 9 to the predetermined intermediate position as soon as the bottom panel of the cartridge 4 rises above the edge portion 19.

Figure 3:
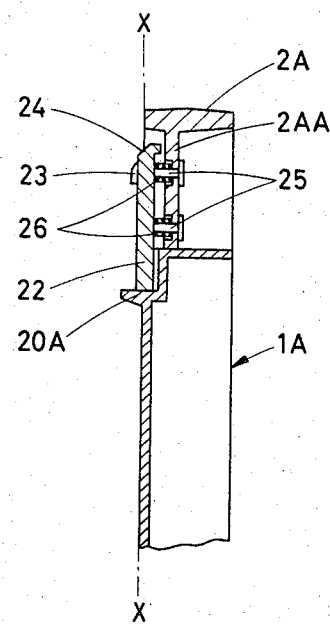
FIG. 3 is a fragmentary transverse vertical sectional view of a second motion picture projector wherein the walls surrounding the inlet of the chamber for cartridges include two movable walls which are located opposite each other and wherein one of these walls serves to facilitate centering of cartridges in the chamber.

FIG. 3 illustrates a portion of a modified motion picture projector. The housing 1A of this projector is integral with a handle 2A and has platform 20A. The parts of the housing 1A to the left of the line X—X shown in FIG. 3 are omitted because such parts are identical with the parts shown to the left of the line X—X in FIG. 1 or below the line X—X of FIG. 2. Thus, the projector of FIG. 3 also comprises two supporting brackets 11 for pivot pins 10, a movable wall or flap 9, first biasing means 12, 15 and second biasing means 13. The centering plate 22 of FIG. 3 constitutes a second movable wall surrounding a longer side of the inlet of the chamber 3 (not shown in FIG. 3), and this plate is located directly opposite the flap which is not shown in FIG. 3. A portion 2AA of the handle 2A is provided with holes for horizontal guide pins 25 which are secured to the centering plate 22 and have stems surrounded by helical springs 26 reacting against the portion 2AA and serving to bias the plate 22 to the illustrated predetermined position in which the latter reduces the area of the inlet of the chamber so that the plate 22 must be moved against the opposition of the springs 26 in order to allow for insertion of a cartridge into the chamber 3 whereby the inserted cartridge rests on the platform 20A. One of the male latching elements on the front surface of the centering plate 22 is shown at 23. These latching elements can be made integral with the plate 22. The plate 22 is further provided with a suitable inclined cam face 24 along which the bottom panel of a cartridge 4 slides during insertion into the chamber whereby the plate 22 is pushed back against the opposition of springs 26 and assumes a cartridge-engaging position corresponding to the solid-line position of the flap 9 shown in FIG. 1. The fully inserted cartridge is biased by springs 26 (through the intermediary of the plate 22 which tends to assume the illustrated position) and also by the leaf spring 13 which acts upon the flap 9 (not shown in FIG. 3) preferably in the same way as shown in FIG. 1.

It is clear that the centering plate 22 may constitute the only movable wall around the inlet of the chamber for cartridges 4. Furthermore, the motion picture projector may comprise two movable walls including the flap 9 of FIG. 1 or the centering plate 22 of FIG. 3 and one of the shorter walls 48, 49 shown in FIG. 2. Thus, the two movable walls may be immediately adjacent to or they may be located opposite each other. If the wall 48 shown in FIG. 2 is movable into and from the path of a cartridge, it can be mounted in the same way as the centering plate 22 of FIG. 3, i.e., for reciprocatory movement toward and away from the opposite wall 49. It is even possible to surround the inlet of the chamber for cartridges with more than two movable walls but it has been found that the use of one or two movable walls (e.g., in a manner as described in connection with FIG. 3) is normally sufficient to insure satisfactory retention of a properly inserted and centered cartridge against the action of such forces to which the cartridge is subjected in normal use of the motion picture projector.

Figure 4:
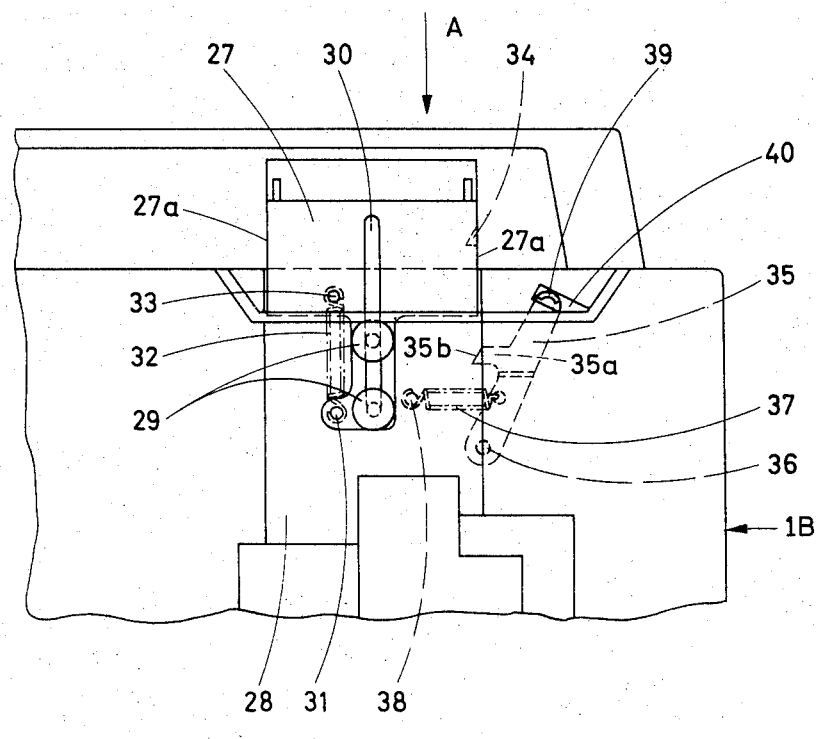
FIG. 4 is a fragmentary elevational view of a third motion picture projector wherein the centering wall is movable in and counter to the direction of insertion of cartridges and can be releasably retained in its operative position.

FIG. 4 shows a portion of a third motion picture projector which comprises a housing 1B and a reciprocable centering plate 27 which may but need not be biased forwardly in a manner as shown for the plate 22 of FIG. 3. Thus the plate 27 may constitute a wall which is movable forwardly and rearwardly (toward and away from the observer of FIG. 4) as well as upwardly and downwardly (in and counter to the direction indicated by arrow A). The plate 27 moves downwardly in response to insertion of a cartridge into the chamber; to this end, the partition 20 shown in FIG. 1 can be provided at the lower end of the plate 27 so that it extends into the path of movement of a cartridge which is being introduced in the direction indicated by arrow A. The plate 27 is reciprocable in a vertical guide groove 28 of the housing 1B and has a post 33 connected to the upper end of a helical spring 32 the lower end of which is connected to a post 31 in the housing 1B. The purpose of the spring 32 is to permanently urge the plate 27 to its raised position. The extent of forward movement of the plate 27 is limited by guide pins 29 which correspond to the guide pins 25 of FIG. 3 and extend through a vertical slot 30 of the plate 27. The springs (corresponding to the springs 26 of FIG. 3) which bias the plate 27 forwardly are not shown in FIG. 4.

One of the two centering edge faces 27a of the plate 27 is provided with a detent notch 34 which can receive a tooth 35a forming part of a retaining lever or detent member 35 which is turnable in the housing 1B on a horizontal shaft 36. A helical spring 37 which is attached to a post 38 in the housing 1B urges the lever 35 in a counterclockwise direction, as viewed in FIG. 4, so that the cam face 35b of the tooth 35a extends into the path of movement of the plate 27 when the latter is caused to advance in the direction indicated by arrow A. The plate 27 then pivots the lever 35 clockwise and the tooth 35a penetrates into the notch 34 as soon as the plate 27 reaches its lower end position. This insures that a properly inserted cartridge is not expelled from its chamber under the action of the spring 32. A handgrip portion 39 extends through a slot 40 in the housing 1B and can be engaged by hand to pivot the lever 35 in a clockwise direction so as to withdraw the tooth 35a from the notch 34 whereby the spring 32 is free to contract and to return the plate 27 to its raised position. The cartridge is simultaneously lifted out of and above the chamber in the housing 1B. The dimensions of the slot 40 are selected in such a way that one of the housing surfaces surrounding the slot 40 determines the extent to which the tooth 35a can move into the path of the plate 27.

The plate 27 may be depressed by hand upon removal of a cartridge from the housing 1B, for example, when the projector is to be transported to a different locale or is to be put to storage. As soon as the plate 27 is depressed, the tooth 35a enters the notch 34 and holds the plate against movement to the illustrated raised position.

Figure 5:
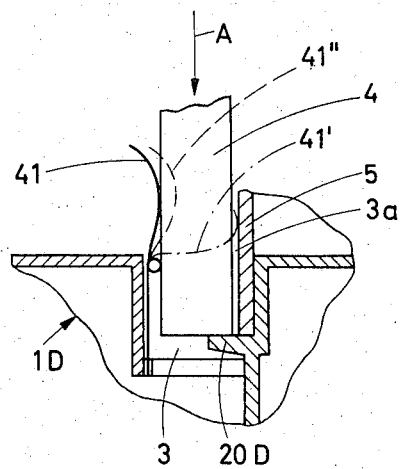
FIG. 5 is a fragmentary transverse vertical sectional view of a fourth motion picture projector wherein the walls surrounding the inlet of the chamber for cartridges include an elastically deformable wall which can close the inlet upon withdrawal of a cartridge and in response to the application of a cover member over the housing of the motion picture projector.

FIG. 5 illustrates a portion of a fourth motion picture projector having a housing 1D defining a chamber 3 and having a platform 20D which determines the extent of movement of a cartridge 4 in the direction indicated by arrow A. The centering plate 5 is assumed to be stationary. The inlet 3a of the chamber 3 is normally closed by an elastic wall or flap 41 which tends to assume its predetermined intermediate position 41″ and is suitably curved so that it can be deformed to assume the solid-line cartridge-engaging and biasing position of FIG. 5. When the cover 50 (see FIG. 1) is placed over the housing 1D (upon removal of the cartridge 4 from the chamber 3), the flap 41 is deformed and assumes the closing position 41′. Upon removal of the cover 50, the flap 41 returns to the predetermined neutral or unstressed position 41″ and must be deformed by a cartridge 4 in order to assume the solid-line position of FIG. 5. The flap 41 may be made at least in part of elastomeric material, such as rubber or a synthetic plastic substance.

The projector of FIG. 5 may be modified by mounting the centering plate 5 (and/or one of the other two walls surrounding the inlet 3a) in the same way as shown for the centering plate 22 of FIG. 3.

Figure 6:
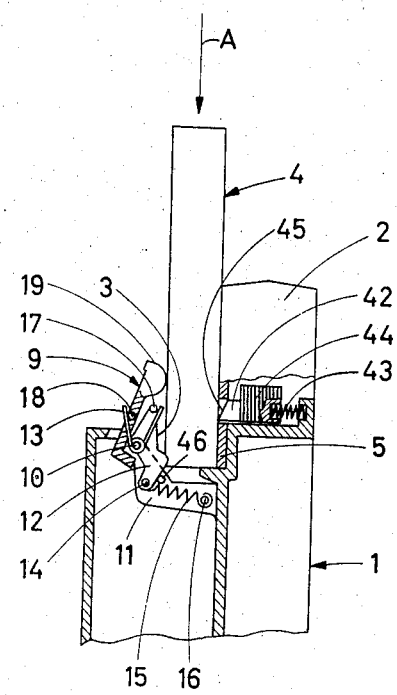
FIG. 6 illustrates a portion of a fifth motion picture projector in a view similar to that of FIG. 1, the projector being provided with means (shown in unlocking position) for releasably locking a movable wall in its closing position.
Figure 7:
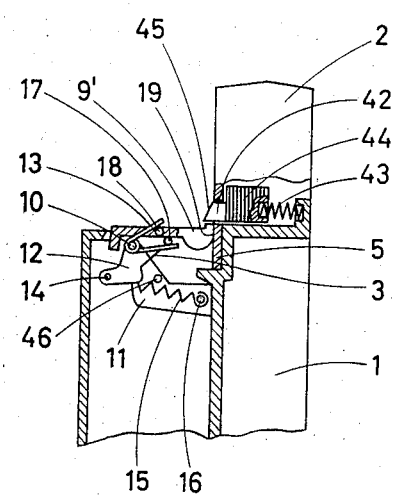
FIG. 7 illustrates the structure of FIG. 6 but with the locking means in the locking position.
Figure 8:
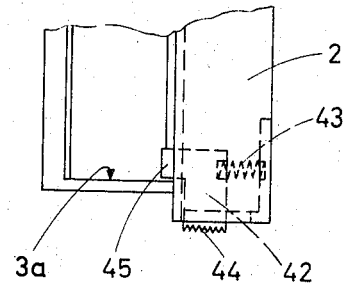
FIG. 8 is a fragmentary plan view of the structure shown in FIG. 7.

FIGS. 6 to 8 illustrate a portion of a fifth motion picture projector which is similar to the projector of FIGS. 1 and 2; therefore, all such parts of this projector which are identical with or clearly analogous to the corresponding parts of the first projector are denoted by similar reference characters.

The projector of FIGS. 6 to 8 further comprises a locking device which can releasably retain the movable wall or flap 9 in the closing position 9′ without resorting to the cover member 50 of FIG. 1. The locking device comprises a reciprocable locking member or bolt 42 which is mounted in the housing 1 and is biased to the locking position shown in FIG. 7 by a helical spring 43. The spring 43 stores energy when the bolt 42 is moved to the retracted or unlocking position of FIG. 6; the tip of the bolt 42 is then flush with the front surface of the centering plate 5. The latching elements 6 and 4a were omitted in FIG. 6 for the sake of clarity. As shown, the locking bolt 42 is reciprocable in a suitable opening of the centering plate 5 and includes an enlarged portion or boss 44 which abuts against the rear surface of the centering plate 5 when the bolt 42 assumes the locking position of FIG. 7. The boss 44 constitutes a handgrip portion which can be grasped by hand to retract the tip of the locking bolt 42 when the user of the projector wishes to release the flap 9 so that the latter can assume its intermediate position under the action of the biasing devices 12, 15 and 13. The forward end of the locking bolt 42 is formed with an inclined surface 45 which extends into the path of movement of the flap 9 to the latter's closing position 9′. The edge portion 19 of the flap 9 depresses the bolt 42 against the opposition of the spring 43 and the spring 43 is free to expand and returns the bolt 42 to the locking position of FIG. 7 as soon as the flap 9 reaches the closing position 9′. When the projector of FIGS. 6–8 is not in use, the flap 9 dwells in the closing position 9′ of FIG. 7. If the user wishes to project the images of a series of film frames on the film in a selected cartridge 4, the handgrip portion 44 is actuated to retract the tip of the locking bolt 42 into the centering plate 5 so that the helical spring 15 is free to contract and pivots the lever 12 to the position of FIG. 6 in which the torsion spring 13 maintains the flap 9 in the latter's predetermined intermediate position (described in connection with FIGS. 1 and 2) in which the edge portion 19 reduces the area of the inlet 3a so that the bottom panel of the cartridge 4 (during insertion in the direction indicated by arrow A) must pivot the flap 9 against the opposition of the torsion spring 13. The lever 12 continues to abut against the stop pin 46 under the action of the helical spring 15.

During insertion into the chamber 3, i.e., during movement of a cartridge 4 in the direction indicated by arrow A, the bottom panel of the cartridge engages the inclined surface 45 and depresses the locking bolt 42 against the opposition of the spring 43. The bolt 42 thereupon remains in the unlocking position of FIG. 7 as long as the cartridge 4 remains in the chamber 3. Upon removal of the cartridge 4, the user pivots the flap 9 to the closing position 9' whereby the edge portion 19 temporarily depresses the bolt 42 by way of the inclined surface 45. As soon as the flap 9 reaches the closing position 9', the spring 43 is free to expand again and the bolt 42 returns to the locking position of FIG. 7.

An important advantage of the projector shown in FIGS. 6 to 8 is that the housing 1 can be protected against dust by resorting to a flexible cover member or by a cover member which need not be designed to move the flap 9 to the closing position 9'. Furthermore, the locking bolt 42 enables the user to maintain the flap 9 in the closing position 9' upon removal of and prior to reapplication of a cover member, such as the cover member 50 of FIG. 1. The cover member normally overlies and protects the exposed control knobs, projector lens and certain other exposed parts on the projector housing.

It is clear that the inclined surface 45 (or a second inclined surface) of the locking bolt 42 can be placed into the path of movement of the cartridge 4 (arrow A) in such position that the cartridge can disengage the bolt from the flap 9 and thus allows the flap to assume its predetermined intermediate position before the edge portion 19 is engaged by the bottom panel of the cartridge. This renders it unnecessary to disengage the bolt 42 from the flap 9 in a separate operation prior to insertion of a cartridge into the chamber 3. It is further possible to provide a link train or the like to temporarily retract the bolt 42 in response to pivoting of the flap 9 toward the closing position 9' so that the bolt 42 need not be retracted in direct response to engagement of its inclined surface 45 by the edge portion 19. As shown in FIG. 8, the handgrip portion 44 includes a knurled surface which extends beyond the adjacent end of the handle 2 so that it can be readily reached by a finger of the user when the user wishes to move the bolt 42 to its unlocking position and to thereby stress the spring 43.

The cover member 50 of FIG. 1 also constitutes a locking means for releasably retaining the movable wall or flap 9 in the closing position 9'.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by letters Patent is set forth in the appended claims:

1. In a cinematographic apparatus for use with film-containing cartridges, particularly in a motion picture projector, a combination comprising a housing defining a cartridge-receiving chamber having an inlet, said housing including a plurality of walls surrounding said inlet and at least one of said walls constituting a pivotable flap tending to assume a predetermined position in which said flap reduces the area of said inlet to less than that necessary for insertion of a cartridge into said chamber so that the insertion of a cartridge into said chamber necessitates a displacement of said flap from said predetermined position and the thus displaced flap bears against the inserted cartridge as a result of its tendency to reassume said predetermined position, said flap being further pivotable to a closing position to thereby at least substantially close said inlet; first biasing means for urging said flap from said closing position; and second biasing means for urging said flap against an inserted cartridge.

2. In a cinematographic apparatus as defined in claim 1 for use with film-containing cartridges of the type having latching means adjacent to at least one wall of said housing in the inserted position of a cartridge, said last mentioned wall having complementary latching means engaging with the latching means of the inserted cartridge to thereby hold the latter against movement in at least one direction relative to said housing.

3. In a cinematographic apparatus as defined in claim 2, wherein the wall having said complementary latching means is located opposite said flap.

4. In a cinematographic apparatus as defined in claim 1 wherein said inlet has a substantially rectangular outline and said walls include a pair of longer and a pair of shorter walls, said movable wall constituting one of said longer walls.

5. In a cinematographic apparatus as defined in claim 1 wherein said walls include a movable wall tending to assume a second predetermined position in which said second movable wall also reduces the area of said inlet to less than that necessary for insertion of a cartridge into said chamber so that the insertion of a cartridge necessitates a displacement of said second movable wall from said second predetermined position and the thus displaced second movable wall bears against the inserted cartridge as a result of its tendency to reassume said second predetermined position.

6. In a cinematographic apparatus as defined in claim 5, wherein said movable wall is adjacent to said flap.

7. In a cinematographic apparatus as defined in claim 5, wherein said movable wall is located opposite said flap.

8. In a cinematographic apparatus as defined in claim 1 wherein said flap consists at least in part of elastomeric material to undergo deformation on movement from said predetermined position as a result of insertion of a cartridge into said chamber.

9. In a cinematographic apparatus as defined in claim 1, and further comprising locking means for releasably holding said flap in said closing position.

10. In a cinematographic apparatus as defined in claim 9, wherein said locking means comprises a bolt mounted in said housing for movement between locking and unlocking positions.

11. In a cinematographic apparatus as defined in claim 9, wherein said locking means comprises a locking member mounted in said housing for movement between locking and unlocking positions and means for biasing said member to said locking position.

12. In a cinematographic apparatus as defined in claim 9, wherein said locking means comprises a locking member mounted in said housing for movement between locking and unlocking positions and having handgrip means actuatable to move the locking member between said positions thereof.

13. In a cinematographic apparatus as defined in claim 9, wherein said locking means comprises a locking member mounted in said housing for movement between locking and unlocking positions and having an inclined surface extending into the path of movement of said flap from said predetermined position to said closing position so that the flap can dislodge said locking member from said locking position but allows said locking member to reassume said locking position in said closing position of said movable wall.

14. In a cinematographic apparatus for use with film-containing cartridges, particularly in a motion picture projector, a combination comprising a housing defining a cartridge-receiving chamber having an inlet, said housing including a plurality of walls surrounding said inlet and at least one of said walls constituting a pivotable flap tending to assume a predetermined position in which said flap reduces the area of said inlet to less than that necessary for insertion of a cartridge into said chamber so that the insertion of a cartridge into said chamber necessitates a displacement of said flap from said predetermined position and the thus displaced flap bears against the inserted cartridge as a result of its tendency to reassume said predetermined position, said flap being further pivotable to a closing to thereby at least substantially close said inlet; pivot means provided in said housing and defining a pivot axis for said flap; first biasing means for urging said flap from said closing position, including a lever turnable about said axis and first resilient means for urging said lever from a first position corrresponding to said closing position of said flap to a second position; and second biasing means for urging said flap against an inserted cartridge, including second resilient means reacting against said lever and bearing against said flap to maintain the latter in said predetermined positon in the second position of said lever and in the absence of a cartridge in said chamber.

* * * * *